July 16, 1940. A. J. BITTSON 2,208,243

FAN

Filed April 7, 1939

INVENTOR.
BY Anthony John Bittson
ATTORNEY.

Patented July 16, 1940

2,208,243

UNITED STATES PATENT OFFICE 2,208,243

FAN

Anthony John Bittson, New York, N. Y., assignor to S. Bernard Gahm, New York, N. Y.

Application April 7, 1939, Serial No. 266,469

7 Claims. (Cl. 230—268)

This invention relates to a folding fan and has for its object to provide a fan which forms a very compact structure when in the folded position and which is maintained in its folded position without coming apart by a simple constructional feature thereof.

Another object is to provide a fan that is relatively large when in the open position and small when in its folded position so that it may easily be carried in the pocket or in a pocketbook.

A further object of this invention is to provide a handle for the fan which fits neatly within the confines of the folded fan and cannot move or slip from its folded position until the fan is opened.

Another object of this invention is to provide a handle for a folding fan which functions to maintain the fan flat when in its open position.

A further object is to provide a simple locking structure which will keep the fan in its folded position.

These and other objects and advantages of this invention will become apparent as the description proceeds, reference being had to the accompanying drawing wherein.

Figure 1:
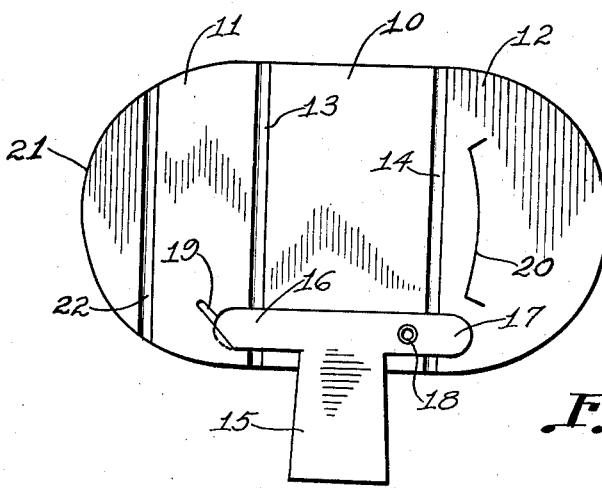
Figure 1 is a front vew of the fan in open position.
Figure 2:
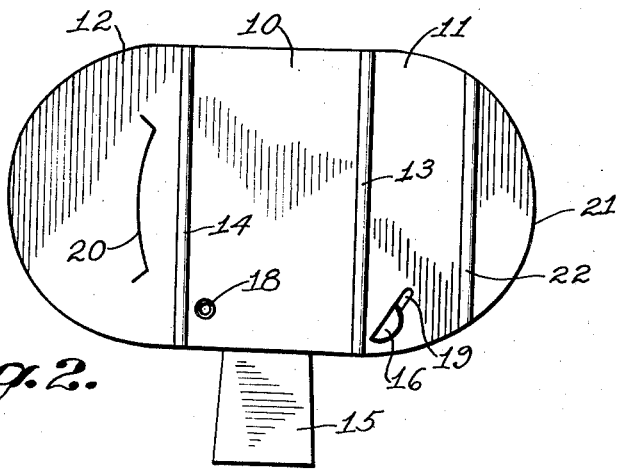
Fig. 2 is a rear view thereof in open position.

The fan comprises a central portion 10 and two wings 11 and 12 which are adapted to fold over the central portion at fold lines 13 and 14 respectively. The fan handle 15 is pivotally connected at 18 to portion 10 near its bottom and has laterally extending arms 16 and 17. The overall height of the handle is slightly less than the width of central portion 10 and it is of a suitable width to provide adequate strength. The span of arms 16 and 17 together with the width of the handle is considerably wider than the central portion 10, so that in open position (Figure 1) the arms extend on to the wings 11 and 12 to hold them flat and make a fan of relatively great width.

Figure 3:
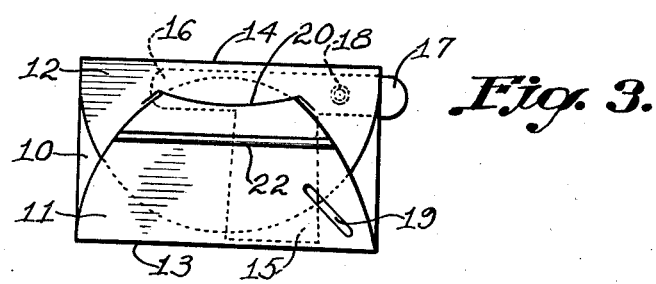
Fig. 3 is a view showing the fan in folded position.

When in the closed position as shown in Fig 3, the handle fits into the width of central portion 10, and, because of the straight edges of the bottom and top of the handle, it cannot swing out of this position.

The pivot 18 is located, relative to the fold line, a distance slightly greater than the distance from the pivot to the top edge of the handle. Thus in the folded position, the top edge of the handle will be adjacent the fold line 14.

For maintaining the handle set or locked in open position, a diagonal slot 19 is provided at the lower portion of wing 11 so located that the end of arm 16 will fit into it and be firmly held.

For maintaining the fan locked in its closed position a slit 20 of any suitable shape is cut in wing 12 into which is adapted to fit the outer edge 21 of wing 11. To facilitate such interfitting action without breaking the wing 11, an impression line 22 is formed on this wing which allows the end of the wing to be bendable at that line when it is being placed into slit 20.

It is to be noted that the fan is completely symmetrical when in the open position and that the cooperation of the outer edge 21 of wing 11 with the slit 20 to lock the fan in closed position makes a simple and advantageous construction for folding and maintaining the fan closed. No extensions are necessary on wing 11 to accomplish this locking.

Because the fan folds into three parts, it is relatively very compact when folded and very wide when open.

I claim:

1. A foldable fan comprising a body having a central section and two symmetrical wings adapted to be folded over the central section, a handle pivotally connected to the central section adapted to be positioned within the confines of the width of the central section when in the inoperative position, a slit in one wing, the outer edge of the other wing adapted to fit into the slit of the first wing to lock the fan in closed position.

2. A foldable fan comprising a body having a central section and two symmetrical wings adapted to be folded over the central section, a handle pivotally connected to the central section adapted to be positioned within the confines of the width of the central section when in the inoperative position, the top and bottom edges of the handle being parallel to and adjacent the fold lines between the wings and the central section when in the inoperative position, a slit in one wing, the outer edge of the other wing adapted to fit into the slit of the first wing to lock the fan in closed position.

3. A foldable fan comprising a body having a central section and two symmetrical wings adapted to be folded over the central section, a handle pivotally connected to the central section adapted to be positioned within the confines of the width of the central section when in the inoperative position, said handle being of sufficient overall width at its widest portion to straddle the central section and to overlap onto the wings when in its operative position to maintain both wings of the fan flat.

4. A foldable fan comprising a body having a central section and two symmetrical wings adapted to be folded over the central section, a handle pivotally connected to the central section adapted to be positioned within the confines of the width of the central section when in the inoperative position, said handle having two arms extending laterally thereof, the overall width of the handle including the two arms being sufficient to straddle the central section and to overlap onto the wings when the handle is in its operative position, a slot in one wing of the fan, one arm of the handle adapted to fit into the slot to hold that wing in open position and to maintain the handle in operative position.

5. A foldable fan comprising a body having a central section and two symmetrical wings adapted to be folded over the central section, a handle pivotally connected to the central section adapted to be positioned within the confines of the width of the central section when in the inoperative position, said handle being of sufficient overall width at its widest portion to straddle the central section and to overlap onto the wings when in its operative position to maintain both wings of the fan flat, a slit in one wing, the outer edge of the other wing adapted to fit into the slit of the first wing to lock the fan in closed position.

6. A foldable fan comprising a body having a central section and two symmetrical wings adapted to be folded over the central section, a handle pivotally connected to the central section adapted to be positioned within the confines of the width of the central section when in the inoperative position, said handle having two arms extending laterally thereof, the overall width of the handle including the two arms being sufficient to straddle the central section and to overlap onto the wings when the handle is in its operative position, a slot in one wing of the fan, one arm of the handle adapted to fit into the slot to hold that wing in open position and to maintain the handle in operative position, a slit in one wing, the outer edge of the other wing adapted to fit into the slit of the first wing to lock the fan in closed position.

7. A folding fan having wings adapted to fold upon each other, a handle for the fan swingable within the confines of the folded fan, a slit in one wing, the edge of the other wing fitting into the slit in the first wing to lock the fan in folded position and to retain the handle within the confines of the folded fan.

ANTHONY JOHN BITTSON.